Figure 1:
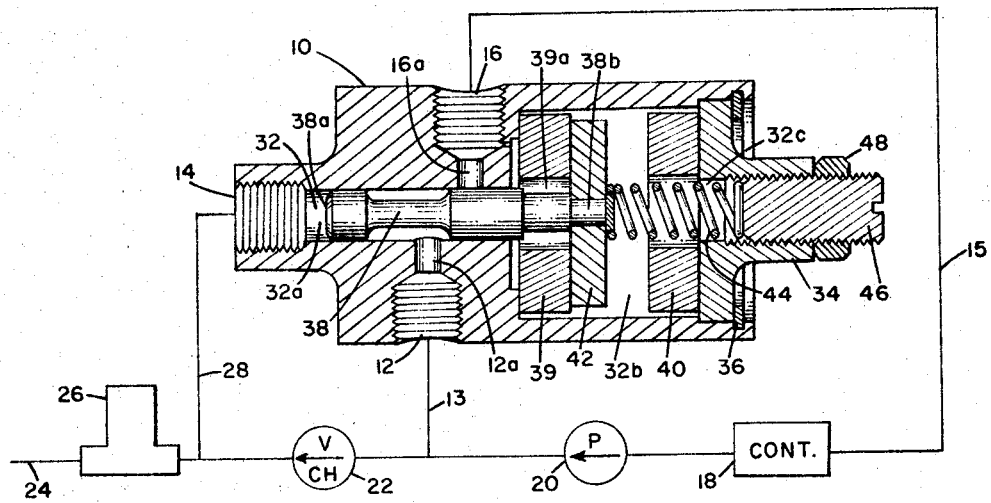

Sept. 6, 1966  H. KIEFER  3,270,763

PRESSURE RESPONSIVE VALVE

Filed Sept. 25, 1963

INVENTOR.
HEINZ KIEFER
BY
ATTORNEY

United States Patent Office 3,270,763
Patented Sept. 6, 1966

3,270,763
PRESSURE RESPONSIVE VALVE
Heinz Kiefer, Ulmenweg 1, Eitorf, Germany
Filed Sept. 25, 1963, Ser. No. 311,538
2 Claims. (Cl. 137—108)

This invention relates, generally, to a pressure responsive valve of the piston type and, more particularly, to a valve having at least one permanent magnet to effect fluid flow control.

The valve of the type here under consideration, finds particular application in hydraulic or pneumatic fluid systems in which the consumption of the fluid is irregular. Ordinarily, this necessitates the use of a pressure reservoir and the capacity of the feed pump is then based on the average rather than the maximum fluid consumption of the system. Nevertheless, since the average consumption is still most frequently too irregular, it is necessary to design the pump on the basis of maximum average fluid consumption. Since the capacity of the pressure reservoir must, of necessity, be limited, it is required to relieve the system of this excess fluid.

In the prior art, a number of approaches have been used, none completely satisfactory. For instance, the drive motor of the feed pump has been electrically controlled to turn the motor on and off at a predetermined minimum and maximum pressure within the fluid system. The disadvantages here are considerable, in that the electrical equipment is relatively expensive and the frequent starting of motor and pump is undesirable.

It is also known in the prior art, to construct a system in which a pressure responsive valve is interposed in the system to cause the fluid to by-pass the main system when the pressure in the system has reached a predetermined maximum and to circulate fluid during the interim period at substantially little pressure in a secondary system until the pressure in the main system is again reduced, at which time the valve directs the fluid again into the main system.

The valves used in the last mentioned mode of operation are, ordinarily, provided with a spring loaded piston. The fluid pressure acts upon the piston and, ultimately overcomes the tension of the opposing spring force thereby opening a fluid outlet. The partial opening of the outlet has the effect of almost simultaneously exerting additional fluid pressure upon another portion of the piston, which increases the force acting against the spring and is effective to, suddenly, completely open the fluid outlet. When the fluid pressure drops to a predetermined minimum value, the outlet gradually closes and the converse cycle takes effect. That is, due to the partial closing of the outlet the effective area of the piston upon which the fluid pressure is exerted is reduced. As a result the opposing spring force exceeds the fluid pressure acting upon the piston and the piston then causes the outlet to be closed.

Since the working fluid is utilized to establish the fluid flow control, i.e. for switching the fluid from the main system into a reservoir or secondary system and vice versa, it frequently occurs that the arrangement of the prior art becomes wholly or partly inoperative due to a state of equilibrium between the fluid medium delivered by the pump and the fluid in the secondary system. Because of this condition, the valve does not respond rapidly enough and sometimes acts merely as a pressure relief valve at the upper and lower limits of the pressure range.

To avoid these shortcomings, various complicated mechanisms have been proposed. For instance, an independent fluid source that would not act directly upon the main piston, but upon a number of secondary pistons which in turn would guide and control the main piston. Another arrangement of the prior art provides for over-center spring devices; still others have suggested the use of electromagnets, which of course necessitates the use of numerous switches and like electrical components and a source of electric energy. Most of the devices of the prior art frequently experience difficulty of operation, but substantially all of them are cumbersome and comparatively expensive.

It is therefore the primary object of this invention to provide a pressure responsive valve avoiding the shortcomings of the prior art, and providing a device of utmost simplicity to facilitate manufacture of the invention at relatively low costs.

It is a further object of this invention to provide a pressure responsive valve obviating the need for intricate mechanisms as disclosed in the prior art, particularly the need for diaphragm springs or the like, secondary pistons to guide the main piston, or external sources of electric energy.

It is a still further object of this invention to provide a pressure responsive valve which executes the opening and closing of the outlet conduits rapidly, in a snap-action-like manner, without fluid pressure equilibrium problems.

For a better understanding of the present invention, together with other and further objects thereof, reference is had to the following description taken in connection with the accompanying drawing, and its scope will be pointed out in the appended claims.

Figure 2:
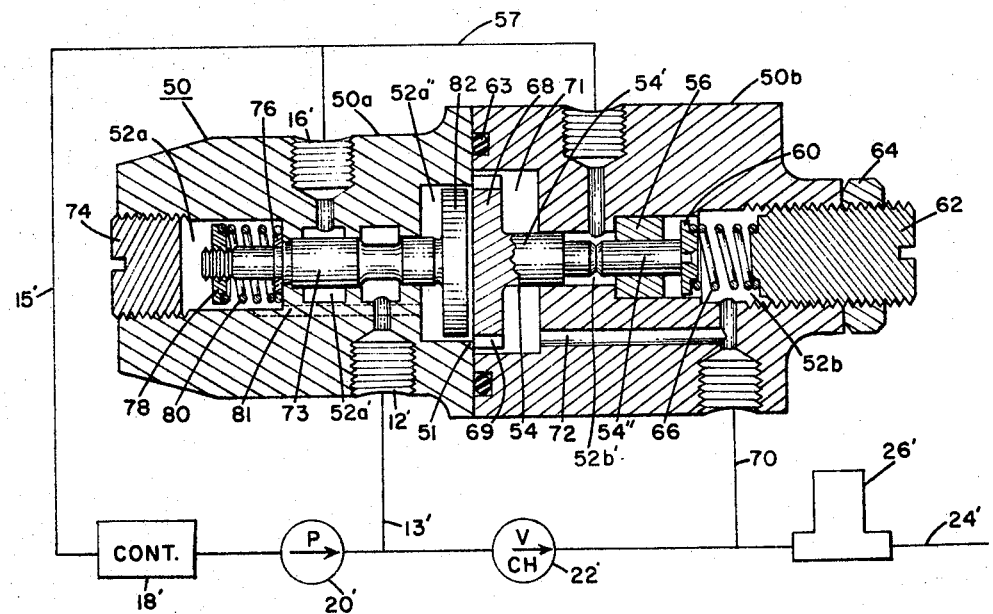

In the drawing:

FIGURE 1 is a longitudinal view shown in section of a pressure responsive valve; and FIGURE 2 is a similar view shown in section of a modified valve in accordance with this invention.

Briefly, an aspect of the present invention resides in the provision of a pressure responsive valve, in the form of a valve body provided with a bore which is connected to a source of fluid under pressure. A fluid inlet and a fluid outlet are arranged in the body and both terminate in the bore at a point axially spaced from each other. A piston member is slidably disposed in the bore in relation to the fluid inlet and outlet and the piston is axially movable in the bore to control fluid flow communication between the inlet and outlet. There is also provided in the bore resilient means, such as a spring, for axially biasing the piston member, and a magnetic snap action arrangement is carried in the bore in cooperating relationship to the piston and the resilient means in such a manner so as to be effective to provide an impact-like axial movement of the piston when the fluid pressure within the bore exceeds the bias exerted upon the piston to establish, suddenly, fluid flow communication between the inlet and the fluid outlet and to suddenly return the piston means to its normal position cutting off the aforesaid fluid flow communication when the effective force acting upon the piston exceeds the fluid pressure within the bore.

Turning now to the drawing, there is shown in FIGURE 1 a valve body 10 having three threaded openings 12, 14, and 16 connectable to a pipe or conduit; and to facilitate a better understanding of the invention, there is also shown, schematically, part of a hydraulic system which includes a fluid container 18, a pump 20 connected to the container 18 and to opening 12, for the purpose of delivering fluid from the container through a check valve 22, a pressure accumulator 26, into another part of the system not shown as such except for conduit 24. A conduit 28 connects the hydraulic system to opening 14 of the valve body 10, while conduit 15 connects opening 16 with container 18.

The valve body 10 has a bore 32 of varying diameter extending longitudinally therethrough, terminating at one end 32a with threaded opening 14. The opposite end 32b of the bore is enlarged and closed by means of a flanged end cover 34 removably held in place by a snap ring 36 carried in an annular groove of the body 10. The openings 12 and 16, hereafter referred as fluid inlet and outlet openings, respectively, are connected with the bore 32 in axially spaced relation through two passageways 12a and 16a.

An elongated piston 38 of varying diameter is slidably carried in small diameter bore portion 32a. The large diameter part of the piston is normally interposed between the inlet and outlet, and the piston is effective to prevent fluid communication between inlet 14 and the outlet 16 when in the position as shown.

The enlarged end 32b of the bore houses two annular plates 39 and 40 composed of ferro magnetic material, both plates being fixedly secured in the bore, axially spaced from each other. Plate 40 abuts end cover 34 while plate 39 abuts a shoulder in the bore 32b. Interposed between plates 39 and 40 is a permanent magnet formed of an annular disc 42. The magnet 42 is securely mounted to a portion 38b of the piston 38 extending through aperture 39a and is movable together with the piston.

Bearing against the magnet 42 is a compression spring 44 exerting a force against the magnet in a direction opposite to the direction of the force exerted by fluid pressure against the outer end of the piston 38a, so that in normal position the magnet rests against plate 39. The spring 44 is suitably seated within bore portion 32c of end cover 34 and set screw 46 in the bore 32c engages the spring 44 biasing the spring against the magnet 42. The set screw 46 is axially movable against the spring to adjust the pre-tension thereof and is maintained in the pre-selected position by nut 48.

In operation, when the pressure in line 24 has reached a predetermined level and this pressure, which continuously acts upon the front face 38a of piston 38, exceeds the opposing force of spring 44 plus the force resulting from the magnetic attraction between magnet 42 and plate 39, the piston 38 is moved towards plate 40 disengaging the magnet 42 from plate 39. The existence of an air gap between the magnet and plate 39 tends to reduce immediately the intensity of the magnetic field therebetween, so that, suddenly, the fluid pressure biased piston is opposed only by spring 44 and an impact-like axial movement takes effect. This, coupled with the magnetic force of attraction between magnet 42 and plate 40, causes a sudden snap-action-like axial displacement of piston 38 until the magnet abuts plate 40 and the piston comes to rest.

In this new position, the forces now opposing spring 44 are the forces created by the magnetic attraction between magnet 42 and the plate 40 as well as the fluid pressure acting against the piston. The small diameter portion of the piston 38 has moved towards outlet 16 thus establishing fluid flow communication between fluid inlet 12 and outlet 16, so that the pump delivers fluid practically without a pressure head through conduit 13 into conduit 15 and back again into container 18. The check valve 22 prevents a backflow of the fluid from conduits 28 and 24 into the container.

As the fluid medium in the hydraulic system is consumed, the pressure in the pressure accumulator 26 and in the bore 14 acting against the piston is proportionally reduced. When the pressure in the system and in the bore has dropped to a predetermined level which exceeds the opposing force of the spring and the magnetic engagement of magnet 42 and plate 40 an action in reverse as above described takes effect.

A little air-gap is first established between magnet 42 and plate 40. With a reduction in the magnetic engagement, the spring 44 suddenly exerts a force substantially exceeding the opposing force exerted by the piston, which is of course still under fluid pressure at the front face 38a. The piston is now suddenly forced by the spring to return to its original and normal position, such axial displacement being again impact-like by virtue of the spring force acting against the magnet and the magnetic force of attraction coming into existence between the magnet and plate 39. Once this position has been reached, fluid flow communication between fluid inlet 12 and outlet 16 is again interrupted and the pump begins to deliver fluid into conduit 24.

A modification of this invention is illustrated in FIGURE 2. There is shown a valve body 50, preferably made in two separate parts, 50a and 50b, suitably secured together and sealed by O-rings 63. The valve body 50 is provided with an axially extending bore 52a and 52b. In the bore portion 52b there is slidably disposed a differential piston 54. The piston 54 consists of one member 54' having a predetermined cross-sectional area and a second member 54" of a smaller cross-sectional area. The piston members are axially aligned in the bore, engaging each other end to end. To maintain member 54" in a coaxial position, a bushing 56 is press fitted into the bore and is adapted to sealingly receive piston member 54". The bore portion 52b' at the junction of the piston members is drainable by means of conduit 57 connected with container 18'.

The outer end of bore 52b receives an adjustable set screw 62, secured to the valve body 50b by means of nut 64. Interposed between the set screw 62 and piston member 54" is a spring 66. One end of the spring rests against the set screw while the other end reacts against the piston member 54" and more particularly the disc 60.

The outer end of piston member 54' is preferably constructed, as shown, integral with a permanent magnet 68 facing the bore 52a and the periphery thereof engages a shoulder 51 of valve body 50a.

The valve body 50a includes an axially movable piston 73 in bore portion 52a. The piston 73 is formed with an axial flange 76 abutting an internal shoulder in bore 52a thus limiting the axial movement of the piston in the direction of the magnetic member 68.

One end of the piston is threaded to receive an adjustable spring retaining disc 78. A compression spring 80 rests against the valve body and reacts against the piston 73 and more specifically the retaining disc 78. The opposite end of the piston 73 carries a permanent magnet 82 facing the magnet 68, the magnet being formed of opposite polarity. The magnets are maintained at all times slightly spaced apart due to the construction described above. The magnet 68 retains magnet 82 in the position as shown against the opposing force of spring 80.

The piston, as normally disposed, interrupts fluid flow between fluid inlet 12' and fluid outlet 16'. However, when the piston is axially displaced toward the end plug 74 in bore 52a, as hereinafter described, and the small diameter portion of the piston 73 enters bore 52a' fluid flow begins to take effect between the inlet and outlet.

The hydraulic system is substantially the same as described in connection with FIGURE 1. The pump delivers fluid from tank 18' through check valve 22' and pressure accumulator 26' into a system of which only conduit 24' is shown.

Fluid of the hydraulic system enters into the bore 52b by way of conduit 70 and bringing fluid into the area occupied mainly by the spring 66 and into contact with the outer end of piston member 54". A longitudinally extending bore 72 connects the conduit 70 with the bore portion 71 occupied by the "large" piston member 54'. The magnet 68 is suitably apertured, see 69, to permit fluid to flow into bore portion 52a" and into connecting conduit 81 and ultimately in bore 52a. In this way, the fluid pressure is effective on both of the outer ends of piston 54 and the pressure against the front face of the piston 73 in bore 52a is also equalized. The conduit 13' connects the pump 20' with fluid inlet 12' while the fluid outlet 16' is connected to the container 18' by means of conduit 15'.

In operation, when more fluid is delivered than required, the pressure gradually rises in the system. Due to a cross-sectional area differential between piston members 54' and 54", the piston 54 as a whole is caused to be axially moved by the fluid pressure in the direction of plug 62 against the opposing force of the spring 66. As a result of such movement, the air gap between the magnets 68 and 82 is increased and the intensity of the magnetic field therebetween is rapidly decreased. When the gap has reached a predetermined width, the holding force of the magnets is suddenly less than the opposing force of spring 80, so that as a sudden unbalance is created, the piston 73 is caused to move axially in an impact-like manner until it engages the plug 74 or, selectively, the magnet 82 engages the valve body 50a. Consequently, the fluid inlet and outlet is now in fluid flow communication and the fluid medium is delivered from the pump therethrough and again into the container 18'.

When the system has reached the predetermined minimum pressure, the differential piston 54 is caused by spring 66 to move toward the magnet 82 and ultimately into the magnetic field of magnet 82. The magnets gradually attract each other against the force of spring 80 until the intensity of the magnetic field is rapidly increased with a decreasing air gap between the magnets and a sudden snap-like axial move of piston 73 brings magnet 82 in abutting position with the valve body as shown, thereby again interrupting the fluid flow between the fluid inlet 12' and outlet 16'.

While there have been described what are at present considered to be the preferred embodiments of this invention, it will be obvious to those skilled in the art that various changes and modifications may be made therein without departing from the invention, and it is, therefore aimed in the appended claims to cover all such changes and modifications as fall within the true spirit and scope of the invention.

What I claim is:

1. A pressure responsive valve comprising, in combination: a body having a fluid pressure sensing aperture connectable to a source of fluid under pressure and an axial bore extending from said aperture; a fluid inlet and outlet opening in said body connecting to said bore; a piston member slidably disposed in said bore in relation to said inlet and outlet and effective to normally cover one of the openings and to preclude any fluid intercourse between said aperture and the openings, said piston member being axially movable in said bore to control fluid flow communication between said inlet and outlet; magnetic snap action means including a magnetic member secured on and movable with said piston and a pair of magnetically responsive members disposed spaced apart on opposite sides of said magnetic member; a spring member arranged in said bore and bearing, at one end, against said magnetic member and extending through one of said magnetically responsive members, said spring providing an opposing force against said piston member in opposition to the fluid under pressure; said magnetic snap action means being effective for establishing a magnetic force for facilitating an impact-like axial movement of said piston member when the fluid pressure within the bore exceeds the opposing force of the spring member and the magnetic force exerted upon said piston to establish, suddenly, fluid flow communication between said inlet and outlet and to suddenly return said piston to its normal position cutting off said fluid flow communication when the forces acting upon said piston member exceed the fluid pressure within said bore.

2. A pressure responsive valve according to claim 1, and screw adjusting means disposed in bearing relation to the opposite end of said spring member and effective for adjusting the said opposing force.

References Cited by the Examiner

UNITED STATES PATENTS

| | | | |
|---|---|---|---|
| 2,306,029 | 12/1942 | Salzer | 251—75 X |
| 2,412,725 | 12/1946 | Fitch | 251—65 X |
| 2,564,894 | 8/1951 | Glasgow | 251—65 X |
| 2,938,540 | 5/1960 | Schatzman | 251—65 X |

M. CARY NELSON, *Primary Examiner.*

A. ROSENTHAL, *Examiner.*